(12) United States Patent
Wang et al.

(10) Patent No.: US 12,045,691 B1
(45) Date of Patent: Jul. 23, 2024

(54) INDICIA READING SYSTEMS AND ASSOCIATED METHODS FOR DETERMINING A TYPE OF MEDIA UPON WHICH ENCODED INDICIA ARE RENDERED

(71) Applicant: ZEBRA TECHNOLOGIES CORPORATION, Lincolnshire, IL (US)

(72) Inventors: Dayou Wang, Mount Sinai, NY (US); Andrew Cornell, East Northport, NY (US); Michelle X. Wang, Mount Sinai, NY (US); Matthew D. Blasczak, Shirley, NY (US); Askold V. Strat, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/127,940

(22) Filed: Mar. 29, 2023

(51) Int. Cl.
*G06K 7/14* (2006.01)
*G06T 9/00* (2006.01)
*G06V 10/60* (2022.01)
*H04N 23/73* (2023.01)
*H04N 23/74* (2023.01)

(52) U.S. Cl.
CPC .............. *G06K 7/1417* (2013.01); *G06T 9/00* (2013.01); *G06V 10/60* (2022.01); *H04N 23/73* (2023.01); *H04N 23/74* (2023.01)

(58) Field of Classification Search
CPC ... G06K 7/1413; G06K 7/1417; G06K 7/1095
USPC ........................................ 235/462.01, 462.25
See application file for complete search history.

(56) References Cited

U.S. PATENT DOCUMENTS

2016/0292481 A1* 10/2016 Igarashi .............. G06K 7/10732
2017/0286557 A1* 10/2017 Lei ...................... G06K 7/10881
2018/0082095 A1*  3/2018 Powell ............... G06K 7/10881

* cited by examiner

*Primary Examiner* — Paultep Savusdiphol
(74) *Attorney, Agent, or Firm* — Yuri Astvatsaturov (57) ABSTRACT

An indicia reading system and associated methods discriminate between types of media upon which encoded indicia is rendered. Encoded indicia rendered upon a medium are imaged using different sets of image acquisition parameter settings. An attempt to decode the encoded indicia that are imaged is made and the image acquisition parameter settings corresponding to successfully decoding the encoded indicia are identified. A type of the medium upon which the encoded indicia is rendered is determined based on which of the sets of image acquisition parameter settings correspond to the encoded indicia being successfully decoded.

21 Claims, 7 Drawing Sheets

INDICIA READING SYSTEMS AND ASSOCIATED METHODS FOR DETERMINING A TYPE OF MEDIA UPON WHICH ENCODED INDICIA ARE RENDERED

BACKGROUND

Indicia encoded with information or data are used in a variety of applications and can be rendered on a variety of different types of media. For example, indicia encoded with information or data can be printed on a physical substrate, such as paper, and/or can be rendered on a display device. Example indicia can include barcodes, which can be scanned and decoded by barcode readers to extract the information that is encoded in the barcodes.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure can use different combinations image acquisition parameter settings when acquiring images of encoded indicia, and the acquired images can be used to determine a type of medium upon which the encoded indicia is rendered. As an example, different combinations of exposure times and/or illumination intensities (e.g., radiant flux, radiant intensity, luminous flux, luminous intensity) can be used to acquire images of encoded indicia. The images acquired using the different combinations of exposure time and illumination intensities can be used to determine if the media upon which the encoded indicia are rendered is a physical substrate, such as paper, or a display device. The encoded indicia can be any set of glyphs that are encode information or data according to, for example, a defined symbology, mapping, or encoding/decoding scheme. Non-limiting examples of encoded indicia can include, for example, linear or 1D barcodes, matrix codes or 2D barcodes, a combination of 1D and 2D barcodes (or stacked barcode), and/or any other symbologies.

In accordance with embodiments of the present disclosure, indicia reading systems, methods, and non-transitory computer-readable storage devices or memory are disclosed for discriminating between types of media upon which encoded indicia are rendered. Embodiments of the systems can include the non-transitory computer-readable storage device or memory and/or a processor. Embodiments of the non-transitory computer-readable storage device or memory stores instructions that are executable by a processor, where execution of the instructions by the processors cause the processor to perform aspects of the methods.

In accordance with embodiments of the present disclosure, a method for discriminating between types of media upon which encoded indicia includes imaging encoded indicia rendered upon a medium using at least two sets of image acquisition parameter settings, attempting to decode the encoded indicia imaged using the at least two sets of image acquisition parameter settings, identifying which of the at least two sets of image acquisition parameter settings correspond to the encoded indicia being successfully decoded, and determining a type of the medium upon which the encoded indicia are rendered based on which of the at least two sets of image acquisition parameter settings are identified as corresponding to the encoded indicia being successfully decoded. The method also includes determining whether the type of the medium matches an expected type of medium, and in response to determining whether the type of medium matches the expected type of medium, generating a message that causes a process to execute a first operation when there is a successful match and to execute a second operation when there is an unsuccessful match.

In accordance with embodiments of the present disclosure, an indicia reading system is disclosed. The indicia reading system includes: an illumination device that emit light; an image sensor that acquires images of encoded indicia, rendered upon a medium, using at least two sets of image acquisition parameter settings; a shutter that controls an exposure time of the image sensor; and a processor. The processor is programmed to receive images of encoded indicia acquired by the image sensor using the at least two sets of image acquisition parameter settings; attempt to decode the encoded indicia in the acquired images; identify which of the at least two sets of image acquisition parameter settings correspond to the encoded indicia being successfully decoded; and determine a type of the medium upon which the encoded indicia are rendered based on which of the at least two sets of image acquisition parameter settings are identified as corresponding to the encoded indicia being successfully decoded.

In accordance with embodiments of indicia reading systems, methods, and/or non-transitory computer-readable storage devices or memory of the present disclosure, the encoded indicia rendered upon the medium can be imaged using a first set of image acquisition parameter settings having a first exposure time and a first illumination intensity and a second set of image acquisition parameter settings having a second exposure time and a second illumination intensity. The first exposure time can correspond to a time period that (i) prevents an image sensor imaging encoded indicia from generating an image of encoded indicia rendered on a display of a display device that is capable of being decoded and (ii) that enables the image sensor to generate an image of encoded indicia rendered on a physical substrate that is capable of being decoded when the first illumination intensity is used. The second exposure time can correspond to a time period that allows the image sensor imaging encoded indicia to generate an image of the encoded indicia that is capable of being decoded. The second exposure time can be greater than the first exposure time and the first illumination intensity can be greater than the second illumination intensity. The second exposure time can be an order of magnitude greater than the first exposure time. The second illumination intensity can correspond to no illumination and/or the first illumination intensity can exceed an illumination intensity of an environment within an imaging field-of-view. For example, when imaging encoded indicia rendered on a display device, the first illumination intensity can exceed an illumination intensity of the display device by an order of magnitude. The first exposure time can be greater than zero seconds and less than one, two, and/or three milliseconds and/or the second exposure time can be greater than five, six, seven, eight, nine, and/or ten milliseconds.

As an example, embodiments of the present disclosure can use two combinations of exposure times and illumination intensities when scanning encoded indicia: (1) a long shutter exposure time without illumination, and (2) a short shutter exposure time with strong illumination. Exposure time and illumination settings of the two combinations can be selected to generate images that can be used for discriminating between, e.g., encoded indicia rendered on paper and encoded indicia rendered on a display device, such as, a display of a mobile device. The image sensor must collect enough photons from the environment to generate a bright enough image for decoding the encoded indicia. For display devices, the photons that are collected by the image sensor are emitted from the display itself and external illumination (i.e., light that is not generated by the display) generally does not help in making the image of the indicia rendered on the display device brighter. One the other hand, for physical substrates, such as paper, the photons that are collected by the image sensor are from reflections from the physical substrates of external illumination from the surrounding environment (i.e., the physical substrate is not the original source of light). So, the brighter the external illumination, the brighter the image of the physical substrate. With very bright illumination, the exposure time can be very short while still allowing the image sensor to collect a sufficient quantity of photons to generate a bright image of the physical substrate. Thus, one exposure time can be selected to be a short exposure time, which corresponds to a time period that prevents the image sensor from collecting a sufficient quantity of photons or light emitted by a display of a display device so that images of encoded indicia rendered on the display of the display device cannot be decoded, but ensures that the image sensor collects a sufficient quantity of photons or light to enable images of indicia on the physical substrate to be decoded when a specified illumination from the illumination devices is used. Another exposure time can be selected to be a long time period, which corresponds to a time period that enables the image sensor to collect a sufficient quantity of photons or light from the display of the display devices, such as a display of a mobile phone, without external illumination from the illumination devices so that images of the display are sufficiently bright to enable decoding of indicia rendered on the display.

In accordance with embodiments of the indicia reading systems, methods, and/or non-transitory computer-readable storage devices or memory of the present disclosure, determining the type of medium, e.g., via the processor, can include determining whether images of the encoded indicia acquired using the second set of image acquisition parameter settings have been successfully decoded a specified number of times; determining whether an image of the encoded indicia acquired using the first set of image acquisition parameter settings has been successfully decoded; and/or determining whether the encoded indicia are rendered upon physical substrate, such as paper, or rendered upon a display of a display device.

The ability to determine a type of medium upon which encoded indicia are rendered can be useful in a variety of applications. As a non-limiting example, the ability to determine a type of medium upon which encoded indicia are rendered can be used to detect ticket fare evasion. For example, a train operator may issue two kinds of tickets: paper tickets and mobile tickets. In one scheme, a paper ticket including encoded indicia printed thereon can be purchased by a first individual at one station. The first individual can acquire an image of the paper ticket, e.g., using a mobile phone or other device, and can transmit the image of the paper ticket to another individual who may be at another station. The second individual displays the image of the paper ticket on the display of his/her mobile phone and encoded indicia reader reads the image of the ticket rendered on the display of the mobile phone at the reader check point, which may or may not be attended by an employee of the train operator (e.g., an automated gate may be actuated in response to scanning the ticket). In such a scenario, detecting that an image of the paper ticket was read and not the paper ticket itself may aid in detecting and/or preventing ticket fare evasion (e.g., by preventing an automated get from opening).

Figure 1:
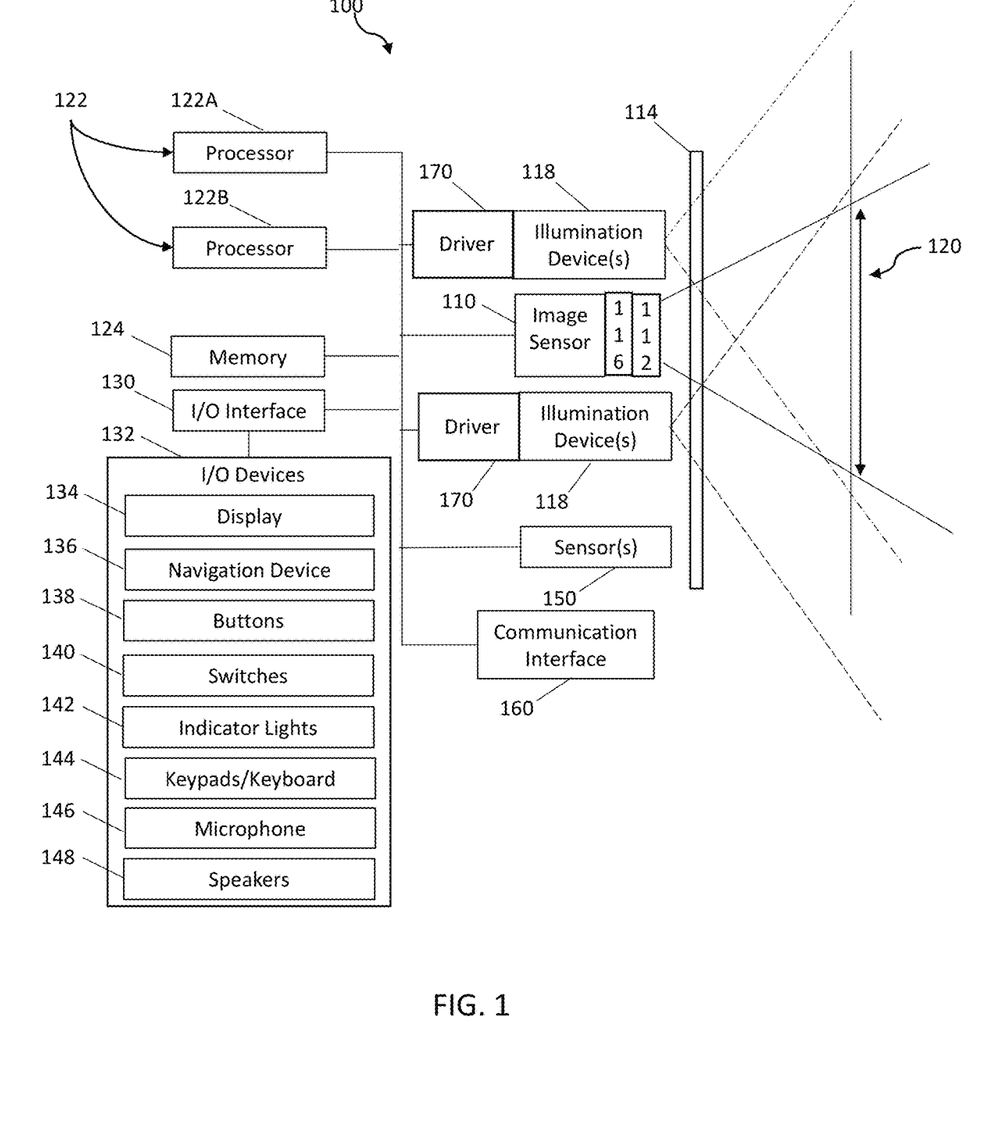
FIG. 1 is a block diagram that illustrates an example indicia reading system in accordance with embodiments of the present disclosure.

FIG. 1 is a block diagram that illustrates an example indicia reading system 100 in accordance with embodiments of the present disclosure. The indicia reading system 100 can be embodied in a variety of configurations including self-contained or integrated configurations in which an operation and function of the indicia reading system 100 is performed by a single apparatus or device and distributed configurations in which the operation and function of the indicia reading system 100 is performed in a distributed manner across multiple apparatuses or devices. The indicia reading system 100, or portions thereof, can be embodied in various form factors including, but not limited to, handheld or mobile form factors with or without a base or dock, wearable form factors, fixed or stationary form factors, semi-stationary form factors, and/or any other suitable form factors. Some examples of the indicia reading system 100 include, but are not limited to, a handheld "gun" style reader that can be held and aimed by a user and/or can rest upon a surface or on a base or dock to be semi-stationary, a mobile reader having a variety of shapes that can be held and aimed by a user and/or can rest upon a surface or on a base or dock to be semi-stationary, a generally fixed or stationary vertical slot scanner having a generally upright window with a fixed field-of-view, a generally fixed or stationary horizontal slot scanner having a generally horizontal window with a fixed field-of-view, a fixed or stationary bioptical workstation having both a generally horizontal window and a generally upright window with fixed fields of view, and/or any suitable form factors and configurations. Embodiments of the indicia reading system 100 can include an imaging sensor 110, an optical focal device 112, a window 114, a shutter 116, illumination devices 118, drivers 120, one or more processors 122, memory 124, Input/Output (I/O) interfaces 130, sensors 150, and/or a communication interface 160.

The image sensor 110 can include an array of photosensitive cells or pixels defining an image frame. Some examples of the image sensor 110 can include a charge coupled device (CCD), a complementary metal-oxide semiconductor (CMOS) imager, and/or another type of image sensor. Common components associated with reading out and processing the charge collected by the image sensor 110, including for example, shift registers, amplifiers, timing/clock generators, analog-to-digital converters, digital-to-analog converters, and/or other components can also be denoted by the image sensor 110. The image sensor 110 captures images of an environment through a light-transmissive lens 112 and/or a window 114, where formation of an image on the photosensitive cells of the image sensor 110 in the image fame corresponds to photons or light scattered from and/or emitted by objects in the environment that impinge upon the photosensitive cells through the window 114, the optical focal device 112, and an aperture formed by the shutter 116. The images captured by the image sensor 110 correspond to an imaging field-of-view (FOV) 120 of the image sensor 110. The imaging sensor 110 can be controlled to continuously capture images, capture a burst, batch, or series of images in response to an activation event, and/or capture a single image in response to an activation event.

The optical focal device 112 can include any variable focus optics (e.g., a deformable lens, a liquid lens, a translatable lens, a translatable grating, or other variable focus optical elements) associated with the image sensor 110 to define a fixed imaging plane or one or more discrete imaging planes for the image sensor 110, which can be adjustably controlled, e.g., via a focusing lens drive, a shift lens drive, a zoom lens drive, an aperture drive, angular velocity drive, voice coil motor drive, and/or other drive units configured to adjust a focal distance associated with the image sensor 110. The indicia reading system 100 can have a fixed focal distance in some examples such that the parameters of the optical focal device 112 are fixed.

The shutter 116, such as a rolling shutter or a global shutter, can be an electronic or electromechanical shutter that controls an exposure aperture and/or exposure time of the image sensor 110 to the environment. A rolling shutter scans across the imaging FOV 120 vertically, horizontally, or rotational such that the image sensor 110 serially captures different portions of the imaging FOV 120 as image frame segments. A single image frame is then created from the series of image frame segments captured across the image FOV 120. A global shutter is controlled such that the image sensor 110 captures the environment within the imaging FOV 120 in a single frame.

The illumination devices 118 can emit diffuse and/or direct light over an illumination field, which may or may not coincide with imaging FOV 120. The light emitted by the illumination devices 118 can be emitted at one or more wavelengths and/or intensities in the light spectrum, including, for example, the visible light spectrum, the infrared light spectrum, and/or the ultraviolet light spectrum. The wavelengths and/or intensities of the light emitted by the illumination devices 118 can be controllable such that the illumination devices 118 can emit light at specified wavelengths and/or intensities. The illumination devices 118 can be continuous light sources, intermittent light sources, or signal-controlled light sources, such as a light source triggered by user interface, an event, an action, and the like. The illumination devices 118 can include, for example, black body radiation sources, infrared light sources, near-infrared light sources, ultraviolet light sources, visible light sources, broad spectrum light sources (e.g., including wavelengths over the visible, near-infrared, infrared, and ultraviolet spectrums), omnidirectional illumination sources, and/or other illumination sources. As a non-limiting example, the illumination devices 118 can be light emitting diodes (LEDs) that can be controlled via the drivers 120 in response to control signals from the one or more processors 122. In an example application, the illumination devices 118 can emit light to illuminate an object in the imaging FOV 120 of the image sensor 110 before and/or during image acquisition. Additionally, the illumination devices can include optics for dispersing, focusing, spreading, and/or filtering the light emitted from the illumination devices 118.

The one or more processors 122 include, for example, one or more microprocessors, central processing units (CPUs), graphics processing units (GPUs), microcontrollers, controllers, field programmable gate arrays (FPGAs), applicant specific integrated circuits (ASICs), and/or any suitable type of logic circuits. The one or more processors 122 can have a single core or multiple cores and can implement serial and/or parallel processing. As an example, the one or more processors 122 can include a processor 122A and/or a processor 122B, where the processor 122A can be programmed to control an operation of the indicia reading system 100 and the processor 122B can be a processor programmed to control an operation of the image sensor 110, shutter 116, illumination devices 118, and/or optical focal device 112, e.g., in response to instructions or signals received from the processor 122A. Alternatively, the processor 122A can control an operation of the image sensor 110, the shutter 116, the illumination devices 118, and/or the optical focal device 112 instead of or in the absence of the processor 122B. The one or more processors 122 control the image sensor 110, the shutter 116, the illumination device 118, and/or the optical focal device 112 to capture images of the portion of the environment within the imaging FOV 120. The one or more processors 122 (e.g., processor 122A and/or processor 12B) can use the acquired images to detect and/or decode encoded indicia (e.g., barcodes) present in the images. One or more image processing and/or object recognition techniques and/or algorithms can be employed by the one or more processors 122 to detect and decode the encoded indicia.

The indicia reading system 100 includes any number or types of non-transitory computer- or machine-readable storage devices or memory (e.g., volatile memory, non-volatile memory, etc.) 124 accessible by the one or more processors 122. The one or more processors 122 interact with the memory 124 to obtain, for example, computer- or machine-readable instructions or code stored in the memory 124. The one or more processors 122 can execute the computer- or machine-readable instructions or code to implement, for example, embodiments of the present disclosure via one or more operations, processes, routines, and/or functions. Additionally or alternatively, computer- or machine-readable instructions corresponding to the example operations described herein may be stored on one or more removable storage devices (e.g., a magnetic storage drive, an optical storage drive, solid state drive, a compact disc (CD), a digital versatile disk (DVD), a removable flash memory, etc.) that may be operatively coupled to the one or more processors 122 to provide access to the computer- or machine-readable instructions stored thereon. The memory 124 can also store images acquired by the image sensor 110; image data associated with the images acquired by the image sensor; encoded information from the indicia captured in the images; decoded information from the decoded indicia captured in the images; image acquisition parameters and associated settings used by the image sensor 110, the shutter 116, the illumination devices 118, and/or the optical focal device 112 to acquire the images; and/or any other information or data.

The I/O interface 130 can include any number and/or different types of I/O circuits, components, and/or interfaces to enable receipt of user input from I/O devices 132, communicate output data via the I/O devices 132, and/or communicate with other devices (e.g., a base, a dock, a POS system, a server, a computing system, etc.). The I/O devices 132 can include a display 134 (including, e.g., touch screen displays), a navigation device 136 (e.g., a mouse, a trackball, a capacitive touch pad, a joystick, etc.) buttons 138, switches 140, indicator lights 142, keypads/keyboard 144, a microphone 146, speakers 148, and/or other devices (e.g., a base, a dock, a POS system, a server, a computing system, etc.). The I/O interface 130 can receive input from a user or another device and/or can output information or data to a user or another device. As an example, a user or other device can actuate, manipulate, and/or control the display 134, the navigation device 136, buttons 138, switches 140, keypads/keyboard 144, and/or microphone 146 and the one or more processors 122 can execute one or more instructions or code in response to the input. As another example, the display 134, indicator lights 142, and/or speakers 148 can be actuated or controlled by the one or more processors 122 to output data or information in response to operations performed by the one or more processors 122, e.g., based on execution of the computer- or machine-readable instructions and/or the input from the user or another device. The I/O interface 130 can be integrated with the one or more processors 122.

The sensors 150 can be included in the indicia reading system 100 to sense or detect environmental, functional, or operational conditions associated with the indicia reading system 100. As an example, the sensors 150 can include a light sensor (e.g., a photosensitive sensor) that can detect an illuminance of the environment within which the indicia reading system is disposed and/or of the imaging FOV 120 within the environment. The one or more processors 122 can receive an output from the sensors 150 and can control one or more operations or parameters of the indicia reading system in response to the output of the sensors 150. As an example, in response to the output of the light sensors, the one or more processors 122 can control the image acquisition parameter settings of the image sensor 110, the shutter 112, the optical focal device, and/or the illumination devices 118 to adjust for the luminance/radiance of the light in the environment and/or in the imaging FOV 120 in the environment. The one or more processors 122 may adjust, for example, an exposure time, an amount of gain applied to the charge output from the pixels of the image sensor 110, an intensity (e.g., radiant flux, radiant intensity, luminous flux, luminous intensity) of the illumination emitted by the illumination devices 118, and/or other image acquisition parameter settings.

The indicia reading system 100 can also include any number and/or type(s) wired and/or wireless communication or network interface(s) 160 that communicatively couple the one or more processors 122 to one or more other devices, such as any one or more of the I/O device 132, a base, a dock, a point-of-sale (POS) station, a server, a computing system, a network device (e.g., router, hub, switch), a cellular base station, etc. The communication interface(s) 160 can facilitate direct communication with the other devices and/or can facilitate indirect communication with the other devices via a network. The communication interface(s) 160 can operate in accordance with any suitable interface(s), protocol(s), signal(s), connector(s), etc. like, for example, a TCP/IP interface, a Wi-Fi™ interface (according to the IEEE 802.11 family of standards), cellular interface (e.g., using GSM, GPRS, CDMA, GPRS, 2G/GSM, 3G, 4G/LTE, EDGE, 5G), a Ethernet transceiver, a universal serial bus (USB) interface, a Bluetooth® interface, a near field communication (NFC) interface, an infrared transceiver, a satellite network radio, a cable modem, a digital subscriber line (DSL) modem, a dialup modem, or any other suitable communication protocols or standards.

As a non-limiting example, to acquire an image, a focal distance and a focal plane can be established via the optical focal device 112 and/or can be specified, e.g., for a fixed focal distance. Once a focal plane is established, the one or more processors 122, e.g., in communication with the image sensor 110 and optical focal device 112, can determine the imaging FOV 120 at the focal plane and control the image sensor 110, the shutter 116, illumination devices 118, and/or the optical focal device 112 to capture the image of the environment within the imaging FOV 120. The one or more processors 122 detect and/or decode encoded indicia (e.g., barcodes) present in images and/or can transmit the information extracted from decoded indicia via the one or more processors 122 to another device (e.g., in a distributed configuration), which can, for example, process the extracted information. The information extracted from decoded indicia may be conveyed to a base, a dock, a POS system, a server, a computing system, etc. as collected and/or in a batches. In the event that the one or more processors 122 are unable to detect and/or decode indicia in an image, the one or more processors 122 can transmit a message to the other device indicating that the indicia could not be detected and/or decoded.

In an example operation, the indicia reading system 100 can discriminate between different types of media upon which indicia can be rendered by acquiring a sequence of images of the encoded indicia using different sets of image acquisition parameter settings. The sets of image acquisition parameter settings used to acquire the images can be associated with the corresponding images in memory. The series of images can be acquired in a session during which the image sensor operates in a burst or batch mode to capture successive image frames of the environment. The image acquisition parameter settings can include the focal distance, the exposure time or shutter speed, the shutter aperture, the illumination intensity (e.g., radiant flux, radiant intensity, luminous flux, luminous intensity), the wavelength(s) of light emitted by the illumination devices, a timing and duration of the illumination relative to operation of the shutter and/or the image frame, a size of the image frame, and/or other image acquisition parameters. As an example, the indicia reading system 100 can operate using two or more different sets of image acquisition parameter settings, which can be dynamically specified, statically specified, and/or can use a combination dynamic and static specification of the image acquisition parameter settings. The image acquisition parameter settings can be specified dynamically in response to, for example, user input, input received from another device, input received from the one or more sensors 150, and/or can be specified based on predetermined image acquisition parameter settings in stored in the memory 124.

In an example embodiment, the indicia reading system 100 can be operated to vary two of the image acquisition parameter settings: exposure time and illumination intensity (e.g., radiant flux, radiant intensity, luminous flux, luminous intensity) to acquire the images. For example, a first set of image acquisition parameter settings can set a first exposure time and a first illumination intensity and a second set of image acquisition parameter settings can set second exposure time and a second illumination intensity. Settings for other image acquisition parameters may also vary between the first and second sets, for example, to facilitate auto-focusing and/or other functions/operations. The second exposure time can be greater than the first exposure time, where the second exposure time can correspond to a long exposure time and the first exposure time can correspond to a short exposure time. For example, the second exposure time can be an order of magnitude (e.g., 10X) greater than the first exposure time.

Examples of a short exposure time can be greater than zero seconds and under about five hundred microseconds (500 us), one millisecond (1 ms), two milliseconds (2 ms), and/or three milliseconds (3 ms) and examples of a long exposure times can be about five milliseconds (5 ms) to about twenty milliseconds (30 ms) or longer, although short and long exposure times can vary, for example, based on the environment, luminance/radiance in the environment, and a distance of the medium being imaged in the environment. As such, a short exposure time can correspond to a time period that prevents the image sensor from acquiring, with illumination from the illumination devices 118, an image of encoded indicia rendered on the display of the display device that can be decoded, but ensures that the image sensor 110 acquires, with illumination from the illumination devices 118, an image of indicia on the physical substrate that can be decoded. A long exposure time can correspond to a time period that enables the image sensor 110 to acquire an image of indicia rendered on the display of the display devices, such as a display of a mobile phone, without illumination from the illumination devices 118 so that the image of the display is sufficiently bright to enable decoding of the indicia rendered on the display from the image.

The first illumination intensity can be greater than the second illumination intensity. For example, the first illumination intensity can be an order of magnitude greater than the second illumination intensity and/or the first illumination intensity can be set to a percent of the maximum illumination intensity of the illumination devices 118 (e.g., 1% to 100%) and second illumination intensity can be zero (i.e., 0% or no illumination) or low illumination (e.g., less than 10% of the maximum possible illumination intensity from the illumination devices). The first illumination intensity can be specified such that the illumination from the illumination devices 118 operating at the first illumination intensity within the imaging FOV 120 exceeds the luminance/radiance of most environments, e.g., measured at the focal distance, where the illumination intensity of the environment at the focal distance may include light contributions from other light sources in the environment including a display device, the sun, artificial light, and/or other sources of light. As an example, the first illumination intensity can be an order of magnitude greater than the illumination intensity output by the display device measured at a surface of the display of the display device (e.g., the glass layer of the display).

A first subset of the images acquired in the sequence of images can be acquired using the first set of image acquisition parameter settings (the first exposure time and illumination intensity) and a second subset of images in the sequence of images can be acquired using the second set of image acquisition parameter settings (the second exposure time and illumination intensity). The first subset and the second subset of images can be acquired in any order. As an example, the first subset can be acquired first and the second subset can be acquired second, the second subset can be acquired first and the first subset can be acquired second, the acquisition of the first and second subsets can be interleaved, and/or any other order of acquisition can be used. In some embodiments, more images can be acquired for the first subset than the second subset, more images can be acquired for the second subset than the first subset, or an equal number of images can be acquired for both subsets.

The one or more processors 122 (e.g., the processor 122A and/or 122B) can attempt to decode the indicia captured in the sequence of images. The one or more processors 122 can decode the images in series and/or in parallel. As an example, as each image in the sequence of images is acquired, the images can be queued for decoding by the one or more processors 122 and the one or more processors 122 can attempt to decode the indicia captured in the next image in the queue. If no images are in the queue, the one or more processors 122 can wait for the next image to be available. As another example, the images in the sequence can be acquired and collectively processed by the one or more processors 122 to attempt to decode the indicia captured in the images (e.g., using processor threads or other parallel processing techniques).

The one or more processors 122 (e.g., the processor 122A and/or 122B) can identify which of the different sets of image acquisition parameter settings correspond to images in which the indicia is successfully decoded, and can determine a type of the medium upon which the indicia is rendered based on which of the different sets of image acquisition parameter settings (e.g., the first set or the second set) are identified as corresponding to the indicia being successfully decoded. As an example, when the indicia is rendered on physical media, such as paper, the indicia captured in the images in the first subset of may be decoded successfully, while indicia captured in the images included in the second subset may or may not be decoded successfully. As another example, when the indicia is rendered on a display device, such as a display of a mobile phone, the indicia captured in the images in the first subset cannot be decoded successfully because image sensor does not collect enough photons or light from the display of the display device to generate an image that is bright enough to enable decoding the indicia, while indicia captured in the images included in the second subset can be decoded successfully because the illumination of the display device and the long exposure time allow the image sensor to capture enough light from the display of the display device to generate an image that is bright enough to enable decoding the indicia. A luminance/radiance of a display of a mobile device cannot typically match the luminance/radiance of the illumination emitted by the illumination devices 118. Thus, to decode encoded indicia on a display of a mobile device, the exposure time of the shutter 116 is longer than the time needed to decode indicia rendered on paper when using illumination from the illumination devices 118. To decode indicia rendered on paper, an exposure time is used that is long enough (e.g., under 3 milliseconds) for the paper under illumination, but short enough so that indica rendered on a display of a mobile device cannot be decoded. When the indicia being decoded from the images corresponds to the image acquisition parameter settings of the second set (long exposure, no illumination), the one or more processors 122 (e.g., the processor 122A and/or 122B) can be programmed to require that a threshold number of images are decoded from the images associated with the second set before determining the type of media upon which the encoded indica is rendered (e.g., a display device).

Figure 2:
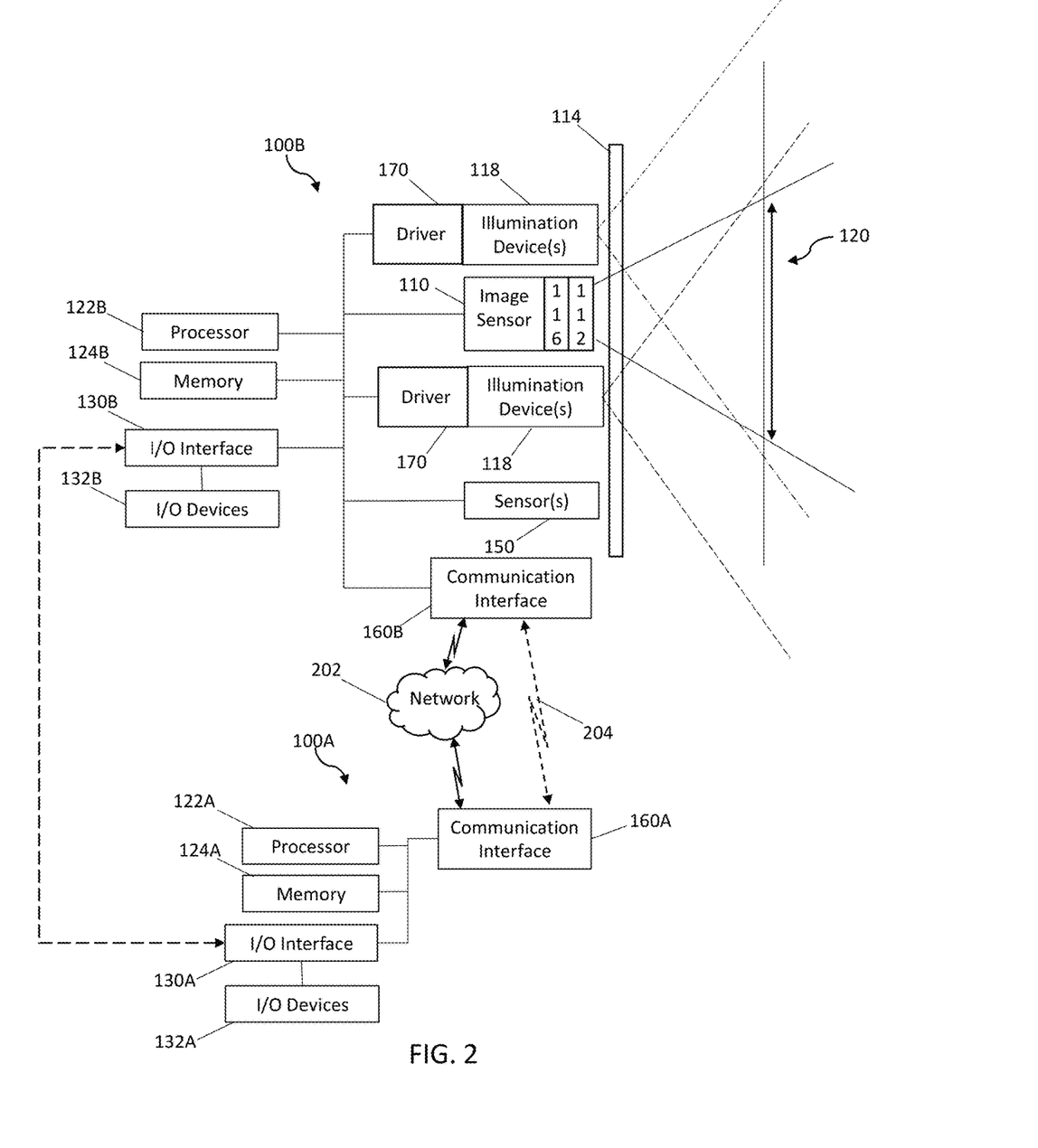
FIG. 2 is a block diagram that illustrates a distributed embodiment of an indicia reading system in accordance with embodiments of the present disclosure.

FIG. 2 is a block diagram that illustrates a distributed embodiment of the indicia reading system via the I/O interface and/or the communication interface in accordance with embodiments of the present disclosure. As an example, with reference to FIG. 2, the indicia reading system can be distributed so that a circuit 100A is indirectly (e.g., via network 202 or another device) or directly (denoted by dashed lines 204 and/or 206) communicatively coupled to a circuit 100B via communication interfaces 160A and 160B and/or through I/O interfaces 130A and 130B. The circuit 100A can include the processor 122A, memory 124A, I/O interface 130A, I/O devices 132A, and communication interface 160A. The circuit 100B can include the image sensor 110, shutter 112, optical focal device 116, illumination devices 118, drivers 120, processor 122B, memory 124B, I/O interface 130B, I/O devices 132B, sensors 150, and communication interface 160B.

The circuits 100A and 100B together can perform the operations of the indicia reading system. The processor 122A and/or the processor 122B can control the image sensor 110, shutter 112, optical focal device 114, and/or illumination devices 118 to acquire images, identify indicia in the images encoded with information or data, decode or attempt to decode the information or data encoded in the indicia, determine a type of medium upon which the indicia are rendered, and/or perform further operations using the information or data decoded from the indicia. As a non-limiting example, the processor 122B can control an operation of the image sensor 110, the optical focal device 112, the shutter 116, and/or the illumination device 118 (e.g., via the drivers 120) to acquire images with different values for one or more image acquisition parameters based on the execution of computer- or machine-readable instructions or code stored in the memory 124B and/or in response to control signals from the processor 122A. The acquired images can be associated with the image acquisition parameter settings used to acquire the images and the processor 122B can attempt to decode encoded indicia in the images. The processor 122B can transmit a message to the processor 122A via the communication interfaces 160B and 160A and/or the I/O interface 130B indicating whether, for a given image, encoded indicia was or was not successful decoded and the image acquisition parameter settings for the given image. The processor 122B can send a message to the processor 122A for each acquired image indicating whether, for each image, encoded indicia was or was not successful decoded and the image acquisition parameter settings for the each image. The processor 122A can execute computer- or machine-readable instructions stored in memory 124A to determine whether the indicia are rendered on a first type of media or a second type of media based on the messages from the processor 122B. Alternatively, the processor 122B can transmit (e.g., via the I/O interface 130B and/or communication interface 160B) the images and their associated image acquisition parameter settings to the processor 122A and the processor 122A can attempt to decode the images and determine whether the indicia are rendered on a first type of media or a second type of media. The processor 122A can interact with the I/O devices 132A to receive input (e.g., such as input requesting image acquisition) and can output information or data associated with the type of media upon which the indicia are rendered.

Figure 3:
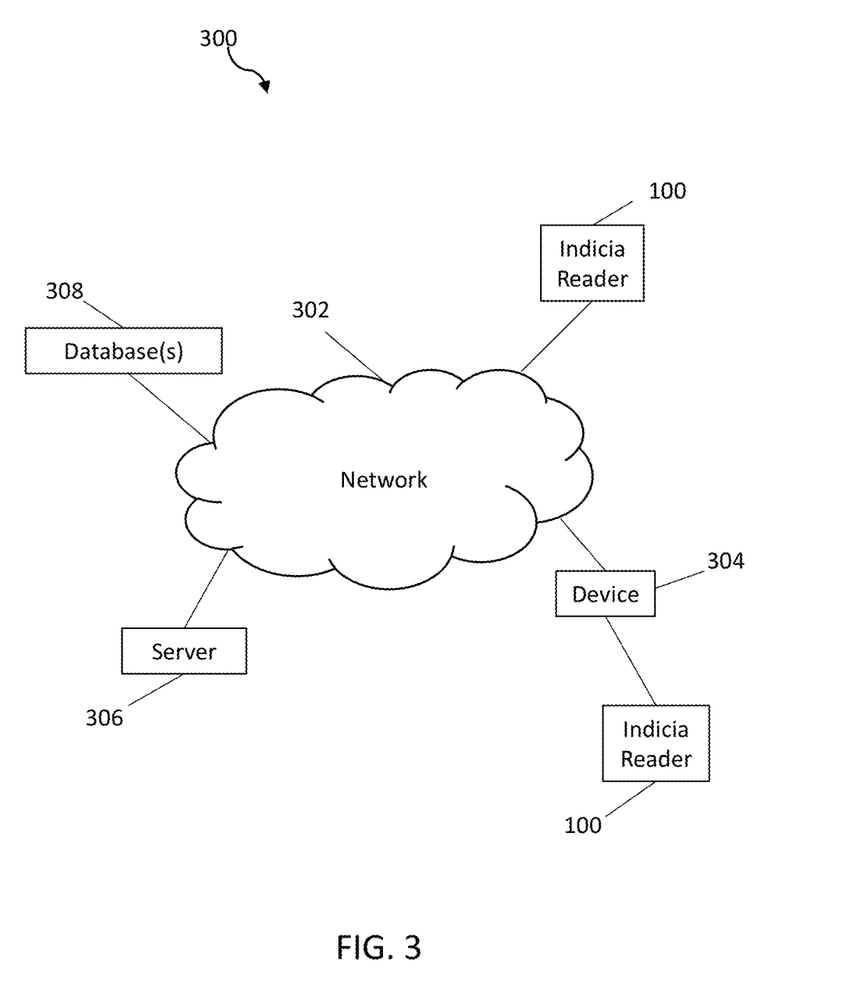
FIG. 3 is a block diagram of an example network environment including example embodiments of the indicia reading system in accordance with embodiments of the present disclosure.

FIG. 3 is an example network environment 300 in accordance with embodiments of the present disclosure. As shown in FIG. 3, the environment 300 can include embodiments of the indicia reading system 100, a device 304, a server 306, and/or a database 308, which can be operatively coupled to each other through a communication network 302. The server 306 can be computing device including a processor for executing instructions in accordance with embodiments of the present disclosure. The device 304 can be, for example, a base, a dock, a point-of-sale (POS) system, a server, and/or a computing device. The device 304 can include a processor for executing instructions in accordance with embodiments of the present disclosure. The communication network can be implemented as the Internet, an Intranet, virtual private network (VPN), wide area network (WAN), local area network (LAN), a cellular network, a mesh or ad-hoc network, and/or other suitable communication network. The indicia reading systems 100, portions of the indicia reading systems (e.g., circuits 100A and/or 100B), and/or the device 304 can communicate with the server 306 and database 308 via the communication network 302.

The indicia reading systems 100 and/or device 304 can communicate with the server 306 to request that the server 306 perform one or more operations. The server 306 can execute computer- or machine-readable instructions or code to perform operations and processes described herein. As an example, messages that include whether indicia was or was not successfully decoded from images and the associated image acquisition parameter settings for the images can be transmitted from the indicia reading systems 100 to the server 306, and the processor of the server 306 can determine a type of media upon which the indicia are rendered based on the messages. The server 306 can transmit a response to the indicia reading system 100 and/or the device 304 associated with the type of media to the indicia reader systems 100 and/or the device 304, the indicia reader systems 100 and/or device 304 can output information or data associated with the response from the server 306 via one or more I/O devices. The server 306 can implement enterprise service software that can include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used.

The network environment 300 can be implemented, for example, to scan tickets in paper and electronic or mobile form, where the tickets include encoded indicia. If a ticket is issued as a paper ticket (e.g., the encoded indicia is printed on a paper substrate), the paper ticket may have to be presented at a ticket checkpoint (e.g., a train terminal, plane terminal, boat terminal, point-of-sale terminal, kiosk, etc.) and/or if a ticket is issued as a mobile ticket (e.g., to be rendered on a display of a mobile phone), the ticket may have to be presented on the display of a mobile device at a ticket checkpoint.

As an example, a ticket including the encoded indicia can be scanned by the indicia reading system 100 using different sets of image acquisition parameter settings as described herein and the indicia reading system 100 can attempt to decode the encoded indicia in the images of the ticket acquired by the indicia reading system 100. The indica reading system 100 can determine whether the ticket that was scanned by the indica reading system 100 was a paper ticket with the encoded indicia printed on the paper ticket or a mobile ticket with the encoded ticket render on a display device as described herein and can transmit a message including the information extracted from the indicia and the type of medium to the device 304 and/or the server 306. Alternatively or in addition, the encoded indicia reading system 100 can transmit a message including the information extracted from the encoded indicia and information about the image acquisition parameter settings of the image(s) that was/were successfully decoded and the device 304 and/or server 306 can determine the type of medium upon which the indicia is rendered as described herein. In response to determining the type of medium upon which the indicia is rendered, the indicia reading system 100, device 304, and/or server 306 can determine whether the determined type of medium matches an expected type of medium, which can be included in the information extracted from the encoded indicia and/or can be stored in a non-transitory storage device of the indicia reading system 100, device 304, server 306, and/or the database 308.

If the medium upon which the encoded indicia decoded by the indica reading system 100 does not match the expected type of medium, the indicia reading system 100, device 304, and/or server 306 can determine that the encoded indicia of the ticket is invalid and an alert message, which can be indicative of a fare evasion event, can be generated by the indicia reading system 100, device 304, and/or server 306. The information corresponding to the expected type of medium upon which the ticket is rendered can be encoded in the encoded indicia included in the ticket (such that the expected type of medium can be determined by decoding the encoded indicia) and/or can be stored, for example, in the indicia reading system 100, the device 304, the server 306, and/or the database 308. One or more operations can be performed in response to the alert message. For example, the alert message can cause the processor(s) (of the indicia reading system 100, device 304, and/or server 306) to generate an audible and/or visual output at the indicia reading system 100 and/or device 304 indicating that the scanned ticket does not match the expected medium type and/or that the ticket is invalid, can generate an log file storing information associated with the ticket and/or the individual who purchased the ticket, prompt a user for input via the indicia reading system 100 and/or device 304, and/or can prevent a gate or turnstile at the ticket checkpoint from opening (e.g., can lock the gate or turnstile) to prevent the ticket holder from advancing beyond the ticket checkpoint.

If the medium upon which the encoded indicia decoded by the indica reading system 100 matches the expected type of medium, the indicia reading system 100, device 304, and/or server 306 can determine that the ticket is valid. In response to a determination that the encoded indicia of the ticket is valid, a valid message can be generated by the indicia reading system 100, device 304, and/or server 306. One or more operations can be performed in response to the valid message. For example, the valid message can cause the processor(s) (of the indicia reading system 100, device 304, and/or server 306) to generate an audible and/or visual output at the indicia reading system 100 and/or device 304 indicating that the scanned ticket matches the expected medium type and/or that the ticket is valid, can generate an log file storing information associated with the ticket and/or the individual who purchased the ticket, prompt a user for input via the indicia reading system 100 and/or device 304, and/or can enable a gate or turnstile at the ticket checkpoint to open (e.g., can unlock and/or open the gate or turnstile) to allow the ticket holder to advance beyond the ticket checkpoint.

While example indicia reading system configurations have been illustrated in FIGS. 1-3, one or more of the aspects illustrated in FIGS. 1-3 may be combined, divided, re-arranged, omitted, eliminated and/or implemented in any other way. Further, the example indicia reading system configurations illustrated in FIGS. 1-3 may include one or more aspects in addition to, or instead of, those illustrated in FIG. 1-3, and/or may include more than one of any or all of the illustrated aspects.

Figure 4A:
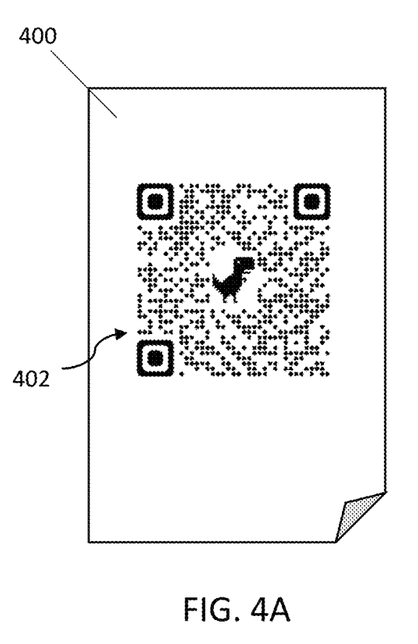
FIGS. 4A-B illustrate non-limiting examples of types of media upon which encoded indicia can be rendered in accordance with embodiments of the present disclosure.
Figure 4B:
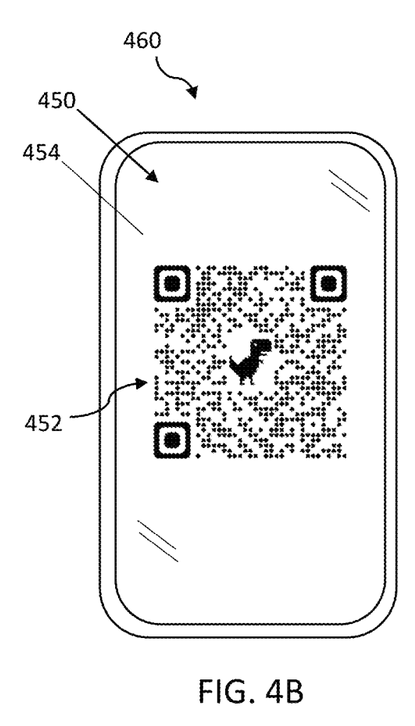

FIGS. 4A-B illustrate non-limiting examples of types of media upon which indicia can be rendered. FIG. 4A shows indicia 402 encoded with information or data rendered on a physical substrate 400, such as a paper media. For example, the indicia 402 can be printed on the physical substrate using a printing technology (e.g., thermal, laser, ink jet, etc.). FIG. 4B shows indicia 452 encoded with information or data rendered on a display 450 of an electronic device 460, such as a mobile phone. For example, the indicia 452 can be rendered on the display as a combination of different colored display pixels using a display technology (e.g., liquid crystal display (LCD), light emitting diode (LED), plasma, etc.). The display can include a layer of glass 454 or other transparent material, where the image is generally render behind the layer of glass 454.

Figure 5A:
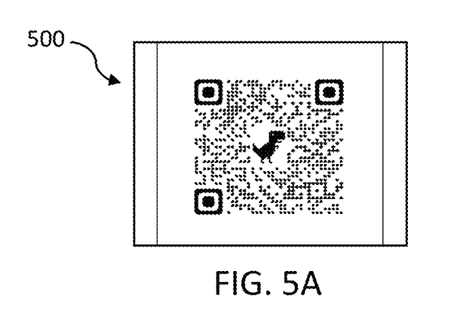
FIGS. 5A-B illustrate non-limiting example depictions of images that can be acquired from a type of media in the form of paper in accordance with embodiments of the present disclosure.
Figure 5B:
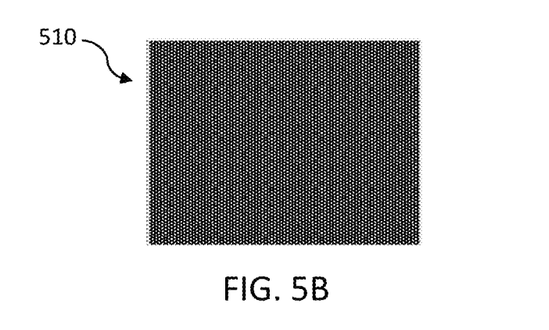

FIGS. 5A-B illustrate non-limiting simplified example depictions of images 500 and 510, respectively, that can be acquired from a type of media having physical substrate (e.g., paper) upon which indicia can be rendered (e.g., printed). The images can be acquired using different settings for the image acquisition parameters. For example, the images 500 and 510 in FIGS. 5A-B, respectively, can be acquired at the same focal distance, while the exposure time and the illumination setting are different between the two images. The image 500 can be an image of the physical substrate where the image 500 was acquired with a short exposure time and a specified illumination intensity of the illumination devices that results in an illumination intensity at the focal distance that is greater than the illumination intensity of the ambient light in the environment within the imaging FOV and/or greater than the illumination intensity of a typical display device of a mobile phone measured at a surface of the display of the display device. The image 510 can be an image of the physical substrate where the image 510 was acquired with a long exposure time and no illumination from the illumination devices of the indicia reader system. The encoded indicia in the image 500 can be decoded by an indicia reading system, while the encoded indica in the image 510 cannot be decode by the indicia reading system. The image sensor collected enough light reflected from the physical substrate within the short exposure time to generate the image 500 which is bright enough to allow the indicia in the image to be decoded. The image sensor did not collect enough light reflected from the physical substrate and generated the dark image 510 that was not bright enough to allow the indicia in the image to be decoded. While the image 510 acquired with a long exposure time and no illumination has been illustrated such that the indicia in not readable by the indicia reading system, for images of the physical substrate using a long exposure time and no illumination, whether or not the indicia in the images is readable can depend on the ambient light in the environment within which the image is acquired. As an example, images of the physical substrate in an environment where the ambient light is sufficiently bright can enable the indicia reading system to decode the indicia, while an environment with low or no ambient light can result in an image similar to the image 510.

Figure 6A:
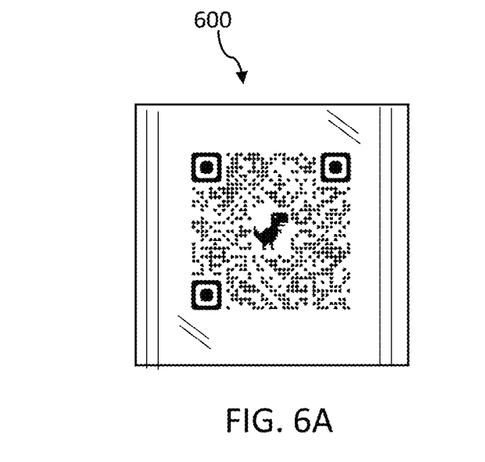
FIG. 6A-B illustrate non-limiting example depictions of images that are acquired from a type of media in the form a display device in accordance with embodiments of the present disclosure.
Figure 6B:
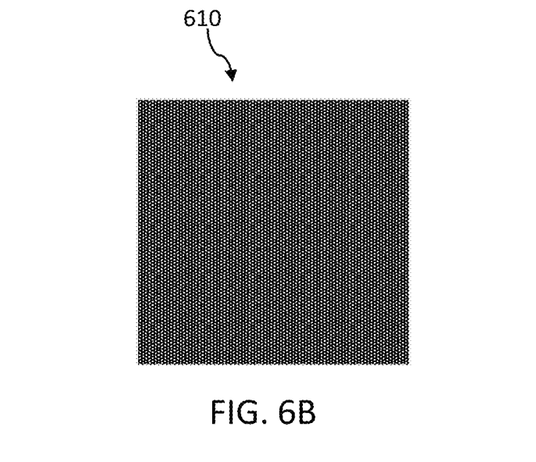

FIGS. 6A-B illustrate non-limiting simplified example depictions of images 600, 610, and 620 respectively, that are acquired from a type of media in the form a display device upon which indicia can be rendered. The images can be acquired using different settings for the image acquisition parameters. For example, the images 600, 610, and 620 in FIGS. 6A-C, respectively, can be acquired at the same focal distance, while the exposure time and the illumination setting are different between the image 600 and the images 610 and 620. The image 600 can be an image of the display where the image 600 was acquired with a long exposure time and no illumination from the illumination devices of the indicia reader system. The image 610 and the image 620 can be images of the display, where the image 610 was acquired with a short exposure time and a specified illumination intensity emitted by the illumination devices of the indicia reader system that results in a illumination intensity at the focal distance that is significantly greater than the illumination intensity of the ambient light in the environment within the imaging FOV and/or greater than the illumination intensity of a display device measured at a surface of the display of the display device. The image 610 can be representative of an image acquired using a global shutter or a rolling shutter. The encoded indicia in the image 600 can be decoded by an indicia reading system, while the encoded indicia in the image 610 cannot be decoded by the indicia reading system. The image sensor collected enough light emitted from the display of the display device within the long exposure time to generate the image 600 which is bright enough to allow the indicia in the image to be decoded. The image sensor did not collect enough light display of the display device and generated the dark image 610 that was not bright enough to allow the indicia in the image to be decoded.

Figure 7:
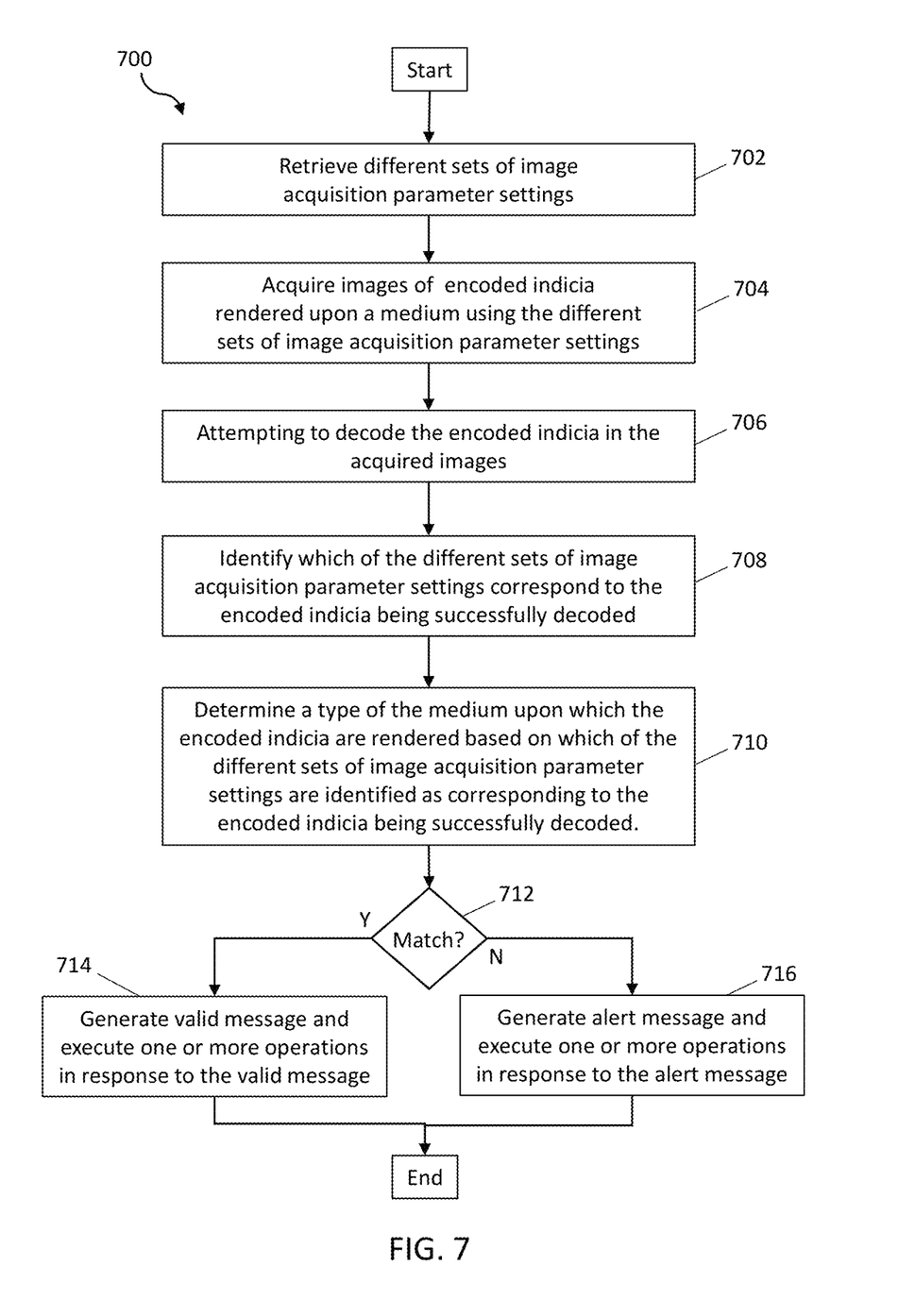
FIG. 7 is a flowchart illustrating an example process for discriminating between different types of media upon which the indicia can be rendered in accordance with embodiments of the present disclosure.

FIG. 7 is a flowchart illustrating an example process 700 for discriminating between different types of media upon which encoded indicia can be rendered in accordance with embodiments of the present disclosure. At operation 702, different sets of image acquisition parameter settings are retrieved from memory by one or more processors (e.g., one or more processors 122), and at operation 704, the one or more processors control the image sensor, the shutter (e.g., a global or rolling shutter), the optical focal device, and/or the illumination devices using the different sets of image acquisition parameter settings to acquire images, via the image sensor, of indicia (e.g., a barcode) rendered on a medium, where the indicia in encoded with information or data. As an example, the different sets of image acquisition parameter settings can include at least two different sets of image acquisition parameter settings. A first set of image acquisition parameter settings can set a first exposure time and a first illumination intensity and a second set of image acquisition parameter settings can set second exposure time and a second illumination intensity. One or more of the first exposure time, the second exposure time, the first illumination intensity, and/or the second intensity can be stored and retrieved from memory and/or one or more of the first exposure time, the second exposure time, the first illumination intensity, and/or the second intensity can be dynamically determined when the images are being acquired (e.g., based on an amount of light in the environment). A first subset of the images acquired in the sequence of images can be acquired using the first set of image acquisition parameter settings (the first exposure time and illumination intensity) and a second subset of images in the sequence of images can be acquired using the second set of image acquisition parameter settings (the second exposure time and illumination intensity). The first subset and the second subset of images can be acquired in any order. At operation 706, the one or more processors attempt to decode the indicia captured in the acquired images, and at operation 708, the one or more processors identify which of the different sets of image acquisition parameter settings correspond to images in which the indicia is successfully decoded. At operation 710, the one or more processors or a different processor (e.g., of the device 304 and/or server 306) determine a type of the medium upon which the indicia are rendered based on which of the different sets of image acquisition parameter settings (e.g., the first set of image acquisition parameter settings or the second image parameter settings) are identified as corresponding to the indicia being successfully decoded. At operation 712, the one or more processors or the different processor determines whether the determined type of medium matches an expected type of medium. If there is a match, the process 700 proceeds to operation 714 at which a valid message is generated by the one or more processors or the different processor, which can cause the one or more processors or the different processor to perform one or more operations in response to the valid message as described herein. If there is no match, the process 700 proceeds to operation 716 at which an alert message is generated by the one or more processors or the different processor, which can cause the one or more processors or the different processor to perform one or more operation in response to the alert message as described herein.

Figure 8:
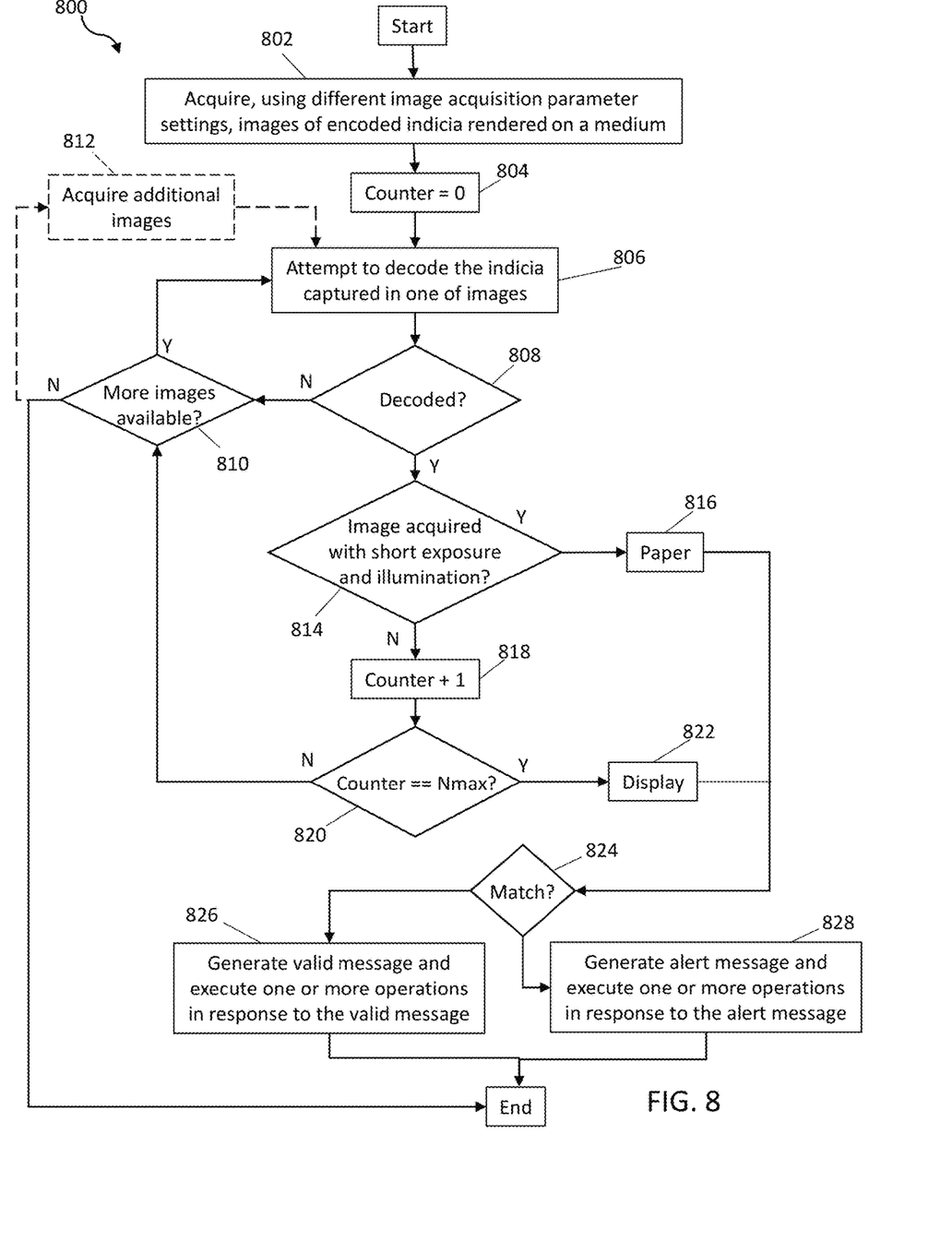
FIG. 8 is a flowchart illustrating another example process for discriminating between different types of media upon which the indicia can be rendered in accordance with embodiments of the present disclosure.

FIG. 8 is a flowchart illustrating an example process 800 for discriminating between different types of media upon which the indicia can be rendered in accordance with embodiments of the present disclosure. At operation 802, images are acquired via the image sensor using different sets of image acquisition parameter settings, and at operation 804, a counter is initialized to zero by one or more processors (e.g., the one or more processors 122). For example, the one or more processors control the image sensor, the shutter (e.g., a global or rolling shutter), the optical focal device, and/or the illumination devices using the different sets of image acquisition parameter settings to acquire images, via the image sensor, of indicia (e.g., a barcode) rendered on a medium, where the indicia in encoded with information or data. As an example, the different sets of image acquisition parameter settings can include at least two different sets of image acquisition parameter settings. A first set of image acquisition parameter settings can set a first exposure time and a first illumination intensity and a second set of image acquisition parameter settings can set second exposure time and a second illumination intensity. One or more of the first exposure time, the second exposure time, the first illumination intensity, and/or the second intensity can be stored and retrieved from memory and/or one or more of the first exposure time, the second exposure time, the first illumination intensity, and/or the second intensity can be dynamically determined when the images are being acquired (e.g., based on an amount of light in the environment). A first subset of the images acquired in the sequence of images can be acquired using the first set of image acquisition parameter settings (the first exposure time and illumination intensity) and a second subset of images in the sequence of images can be acquired using the second set of image acquisition parameter settings (the second exposure time and illumination intensity). The first subset and the second subset of images can be acquired in any order. At operation 806, the one or more processors attempt to decode indicia (e.g., a barcode) captured in one of the images. At operation 808, it is determined whether the indicia was successfully decoded. If not, it is determined at operation 810 whether there are more images available. If there are additional images available, the process returns to operation 806 to attempt to decode another one of the acquired images. If there are no more images available, the one or more processors can acquire addition images at operation 812 or the process 800 can end.

Returning to operation 808, if the indicia in the image is successfully decoded, the process 800 proceeds to operation 814 to determine whether the image from which the indicia was successfully decoded was acquired with a short exposure time and a specified illumination from the illumination devices. If so, the type of medium upon which the indicia is rendered is determined to be a physical substrate, such as paper, by the one or more processors or a different processor (e.g., of the device 304 and/or server 306) at operation 816, and the process 800 proceeds to operation 824. If not (e.g., because the image was acquired using a long exposure time and a no illumination), the counter is incremented by one at operation 818, and the one or more processors of the different processor determines whether the value of the counter is equal to a specified threshold value (Nmax) at operation 820. If so, the one or more processors or the different processor determines that the type of medium upon which the indicia is rendered is a display device (e.g., of a mobile phone) at operation 822, and the process 800 proceeds to operation 824. If it is determined that the value of the counter is less than the specified threshold value at operation 820, the process 800 proceeds to operation 810 as described herein. At operation 824, the one or more processors or the different processor determines whether the determined type of medium matches an expected type of medium. If there is a match, the process 800 proceeds to operation 826 at which a valid message is generated by the one or more processors or the different processor, which can cause the one or more processors or the different processor to perform one or more operations in response to the valid message as described herein. If there is no match, the process 800 proceeds to operation 828 at which an alert message is generated by the one or more processors or the different processor, which can cause the one or more processors or the different processor to perform one or more operation in response to the alert message as described herein.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for discriminating between types of media upon which encoded indicia is rendered, the method comprising:
   imaging encoded indicia rendered upon a medium using at least two sets of image acquisition parameter settings;
   attempting to decode the encoded indicia imaged using the at least two sets of image acquisition parameter settings;
   identifying which of the at least two sets of image acquisition parameter settings correspond to the encoded indicia being successfully decoded;
   determining a type of the medium upon which the encoded indicia is rendered based on which of the at least two sets of image acquisition parameter settings are identified as corresponding to the encoded indicia being successfully decoded;
   determining whether the type of the medium matches an expected type of medium; and
   in response to determining whether the type of medium matches the expected type of medium, generating a message that causes a process to execute a first operation when there is a successful match and to execute a second operation when there is an unsuccessful match.

2. The method of claim 1, wherein imaging encoded indicia rendered upon the medium comprises imaging the encoded indicia using a first set of image acquisition parameter settings having a first exposure time and a first illumination intensity and a second set of image acquisition parameter settings having a second exposure time and a second illumination intensity.

3. The method of claim 2, wherein the second exposure time is greater than the first exposure time and the first illumination intensity is greater than the second illumination intensity.

4. The method of claim 3, wherein the second exposure time is an order of magnitude greater than the first exposure time.

5. The method of claim 3, wherein the second illumination intensity corresponds to no illumination and the first illumination intensity generates a brightness at a focal distance that exceeds a brightness of an environment within which the encoded indicia are imaged.

6. The method of claim 3, wherein the first exposure time corresponds to a time period that (i) prevents an image sensor imaging the encoded indicia from generating an image of encoded indicia rendered on a display of a display device that is capable of being decoded and (ii) that enables the image sensor to generate an image of encoded indicia rendered on a physical substrate that is capable of being decoded when the first illumination intensity is used.

7. The method of claim 2, wherein determining the type of medium comprises:

determining whether images of the encoded indicia acquired using the second set of image acquisition parameter settings have been successfully decoded a specified number of times.

8. The method of claim 2, wherein determining the type of medium comprises;
determining whether an image of the encoded indicia acquired using the first set of image acquisition parameter settings has been successfully decoded.

9. The method of claim 1, wherein determining the type of medium comprises determining whether the encoded indicia are rendered upon paper or a display of a display device.

10. An indicia reading system, comprising:
an illumination device that emit light;
an image sensor that acquires images encoded indicia, rendered upon a medium, using at least two sets of image acquisition parameter settings;
a shutter that controls an exposure time of the image sensor; and
a processor programmed to:
receive images of encoded indicia acquired by the image sensor using the at least two sets of image acquisition parameter settings;
attempt to decode the encoded indicia in the acquired images;
identify which of the at least two sets of image acquisition parameter settings correspond to the encoded indicia being successfully decoded; and
determine a type of the medium upon which the encoded indicia are rendered based on which of the at least two sets of image acquisition parameter settings are identified as corresponding to the encoded indicia being successfully decoded.

11. The indicia reading system of claim 10, wherein the at least two image acquisition parameter settings include a first set of image acquisition parameter settings having a first exposure time and a first illumination intensity and a second set of image acquisition parameter settings having a second exposure time and a second illumination intensity.

12. The indicia reading system of claim 11, wherein the second exposure time is greater than the first exposure time and the first illumination intensity is greater than the second illumination intensity.

13. The indicia reading system of claim 12, wherein the second exposure time is an order of magnitude greater than the first exposure time.

14. The indicia reading system of claim 11, wherein the second illumination intensity corresponds to no illumination and the first illumination intensity generates a brightness at a focal distance that exceeds a brightness of an environment within which the encoded indicia are imaged.

15. The indicia reading system of claim 11, wherein the first exposure time corresponds to a time period that (i) prevents an image sensor imaging the encoded indicia from generating an image of encoded indicia rendered on a display of a display device that is capable of being decoded and (ii) that enables the image sensor to generate an image of encoded indicia rendered on a physical substrate that is capable of being decoded when the first illumination intensity is used.

16. The indicia reading system of claim 11, the processor determines the type of medium upon which the encoded indicia are rendered by determining whether images of the encoded indicia acquired using the second set of image acquisition parameter settings have been successfully decoded a specified number of times.

17. The indicia reading system of claim 11, wherein the processor determines the type of medium upon which the encoded indicia are rendered by determining whether an image of the encoded indicia acquired using the first set of image acquisition parameter settings has been successfully decoded.

18. The indicia reading of claim 10, wherein the processor determines the type of medium by determining whether the encoded indicia are rendered upon paper or a display of a display device.

19. A non-transitory computer-readable medium comprising instructions, wherein execution of the instructions by a processor causes the processor to:
image, via an image sensor, encoded indicia rendered upon a medium using at least two sets of image acquisition parameter settings;
attempt to decode the encoded indicia imaged using the at least two sets of image acquisition parameter settings;
identify which of the at least two sets of image acquisition parameter settings correspond to the encoded indicia being successfully decoded;
determine a type of the medium upon which the encoded indicia is rendered based on which of the at least two sets of image acquisition parameter settings are identified as corresponding to the encoded indicia being successfully decoded;
determine whether the type of the medium matches an expected type of medium; and
in response to determining whether the type of medium matches the expected type of medium, generate a message that causes a process to execute a first operation when there is a successful match and to execute a second operation when there is an unsuccessful match.

20. The medium of claim 19, wherein execution of the instructions by the processor causes the processor to:
determine the type of medium by determining whether the encoded indicia are rendered upon paper or a display of a display device.

21. An indicia reading system, comprising:
a non-transitory computer-readable storage device storing instructions; and
a processor configured to execute the instruction to:
receive images of encoded indicia acquired by an image sensor using the at least two sets of image acquisition parameter settings;
attempt to decode the encoded indicia in the acquired images;
identify which of the at least two sets of image acquisition parameter settings correspond to the encoded indicia being successfully decoded; and
determine a type of the medium upon which the encoded indicia are rendered based on which of the at least two sets of image acquisition parameter settings are identified as corresponding to the encoded indicia being successfully decoded;
determine whether the type of the medium matches an expected type of medium; and
in response to determining whether the type of medium matches the expected type of medium, generate a message that causes the processor to execute a first operation when there is a successful match and to execute a second operation when there is an unsuccessful match.

* * * * *